US012792755B2

(12) United States Patent
Zhang et al.

(10) Patent No.: US 12,792,755 B2
(45) Date of Patent: Nov. 10, 2026

(54) VIRTUALIZATION AND ENCRYPTION OF FILES FOR SEAMLESS ACCESS

(71) Applicant: Deloitte Development LLC, Hermitage, TN (US)

(72) Inventors: Haibo Zhang, Beijing (CN); Egemen Tas, North Bergen, NJ (US)

(73) Assignee: Deloitte Development LLC

( * ) Notice: Subject to any disclaimer, the term of this patent is extended or adjusted under 35 U.S.C. 154(b) by 91 days.

(21) Appl. No.: 18/941,835

(22) Filed: Nov. 8, 2024

(65) Prior Publication Data

US 2026/0134120 A1 May 14, 2026

(51) Int. Cl.
*G06F 21/62* (2013.01)
*G06F 21/55* (2013.01)
*G06F 21/60* (2013.01)

(52) U.S. Cl.
CPC ........ *G06F 21/6209* (2013.01); *G06F 21/552* (2013.01); *G06F 21/602* (2013.01)

(58) Field of Classification Search
CPC ... G06F 21/6209; G06F 21/552; G06F 21/602
See application file for complete search history.

(56) References Cited

U.S. PATENT DOCUMENTS

| | | | | |
|---|---|---|---|---|
| 11,095,652 | B2* | 8/2021 | Lewis | H04L 63/102 |
| 11,216,566 | B1* | 1/2022 | Monakhov | G06F 21/78 |
| 2005/0169073 | A1* | 8/2005 | Cook | G06F 9/44584 365/202 |
| 2015/0106946 | A1* | 4/2015 | Soman | G06F 21/602 726/26 |
| 2017/0249472 | A1* | 8/2017 | Levy | G06F 21/6245 |
| 2018/0260578 | A1* | 9/2018 | Orloff | G06F 21/6209 |
| 2018/0293394 | A1* | 10/2018 | Gunda | G06F 9/45558 |
| 2019/0034645 | A1* | 1/2019 | El-Moussa | G06F 21/62 |
| 2020/0193016 | A1* | 6/2020 | Zeng | G06F 11/3006 |
| 2021/0342484 | A1* | 11/2021 | Creti | G06F 21/554 |
| 2022/0070246 | A1* | 3/2022 | Ripa | H04L 67/06 |
| 2022/0156398 | A1* | 5/2022 | Moore | H04L 9/0841 |
| 2022/0236858 | A1* | 7/2022 | Gabryjelski | G06F 3/04842 |
| 2022/0366042 | A1* | 11/2022 | Summers | G06F 21/565 |
| 2023/0101774 | A1* | 3/2023 | West | G06F 3/0488 715/770 |
| 2023/0342374 | A1* | 10/2023 | Sitsky | G06F 9/44521 |
| 2023/0342497 | A1* | 10/2023 | Goodridge | G06F 21/6281 |
| 2023/0385403 | A1* | 11/2023 | Czerninski | G06F 21/54 |
| 2023/0403324 | A1* | 12/2023 | Matoba | H04L 43/04 |
| 2023/0418933 | A1* | 12/2023 | Lowry | G06F 21/54 |
| 2024/0069985 | A1* | 2/2024 | Ghezzal | G06F 16/182 |
| 2024/0176607 | A1* | 5/2024 | Kumar | G06F 9/445 |
| 2024/0202097 | A1* | 6/2024 | Kelly | G06F 21/566 |
| 2024/0386109 | A1* | 11/2024 | Kurtz | G06F 21/566 |
| 2025/0028442 | A1* | 1/2025 | Macdonald | G06F 3/04892 |
| 2025/0272184 | A1* | 8/2025 | Bailey | G06F 11/0727 |

* cited by examiner

*Primary Examiner* — Stephen T Gundry
(74) *Attorney, Agent, or Firm* — Fish & Richardson P.C.

(57) ABSTRACT

Virtualizing and encrypting files for seamless user access is described herein. A method includes monitoring file creation within a container located on a host system for creation that satisfies at least one predefined rule. The method also includes generating a shortcut pointing to a launcher application on an external file system of the host system when a file is created. An identifier associated with the shortcut is added to a shadow shortcut list. Executing the shortcut causes execution of the created file within the security container.

18 Claims, 5 Drawing Sheets

100

200

300

400

VIRTUALIZATION AND ENCRYPTION OF FILES FOR SEAMLESS ACCESS

TECHNICAL FIELD

This description is related to resource access in a secure architecture.

BACKGROUND

Computer security, cybersecurity, digital security or information technology security refers to the protection of computer systems and networks from malicious actors. Malicious actors cause unauthorized information disclosure, theft of, or damage to hardware, software, or data, as well as the disruption or misdirection of the services computer systems and networks provide. Organizations rely on computer systems and networks with far-reaching physical effects. Various security models govern the cybersecurity implemented by an organization across large scale computer systems and networks.

SUMMARY

Provided herein are techniques that enable virtualization and encryption of files for seamless access. In some embodiments, a method is provided. The method includes monitoring, using at least one hardware processor, file creation within a container located on a host system for creation that satisfies at least one predefined rule. The method includes generating, using the at least one hardware processor, a shortcut pointing to a launcher application on an external file system of the host system when a file is created. The method includes adding, using the at least one hardware processor, an identifier associated with the shortcut to a shadow shortcut list. The method includes executing, using the at least one hardware processor, the shortcut from the external file system, wherein executing the shortcut causes execution of the created file within the container.

In some embodiments, a system includes at least one processor, and at least one non-transitory storage media storing instructions that, when executed by the at least one processor, cause the at least one processor to monitor file creation within a container located on a host system for creation that satisfies at least one predefined rule. The instructions cause the at least one processor to generate a shortcut pointing to a launcher application on an external file system of the host system when a file is created. The instructions cause the at least one processor to add an identifier associated with the shortcut to a shadow shortcut list. The instructions cause the at least one processor to execute the shortcut from the external file system, wherein executing the shortcut causes execution of the created file within the container.

In some embodiments, at least one non-transitory storage media is provided. The at least one non-transitory storage media stores instructions that, when executed by at least one processor, cause the at least one processor to monitor file creation within a container located on a host system for creation that satisfies at least one predefined rule. The instructions cause the at least one processor to generate a shortcut pointing to a launcher application on an external file system of the host system when a file is created. The instructions cause the at least one processor to add an identifier associated with the shortcut to a shadow shortcut list. The instructions cause the at least one processor to execute the shortcut from the external file system, wherein executing the shortcut causes execution of the created file within the container.

In some embodiments, the at least one predefined rule is one of a predetermined file name, file path, file type, file size, file attribute, or author.

In some embodiments, the shortcut is removed from the external file system and the identifier associated with the shortcut is removed from the shadow shortcut list responsive to the file being deleted from the container.

In some embodiments, the shortcut from the external file system is renamed and the identifier associated with the shortcut from the shadow shortcut list is renamed responsive to the file being deleted from the container.

In some embodiments, file system requests directed to the containerized file to the shortcut are intercepted using the shadow shortcut list.

In some embodiments, the shortcut is executed from the external file system without kernel level components.

In some embodiments, a target of the shortcut is an executable image, and command line parameters passed the executable image contains information about the original and redirected file location.

In some embodiments, redirected files associated with the container are encrypted at a file level.

In some embodiments, redirected files are stored on a separate virtual disk and optionally the disk is encrypted at disk level.

The details of one or more embodiments of the invention are set forth in the accompanying drawings and descriptions below. Other features, objects and advantages of the invention will be apparent from the description and drawings, and from the claims.

DESCRIPTION OF DRAWINGS

Like reference symbols in the various drawings indicate like elements.

DETAILED DESCRIPTION

Figure 1:
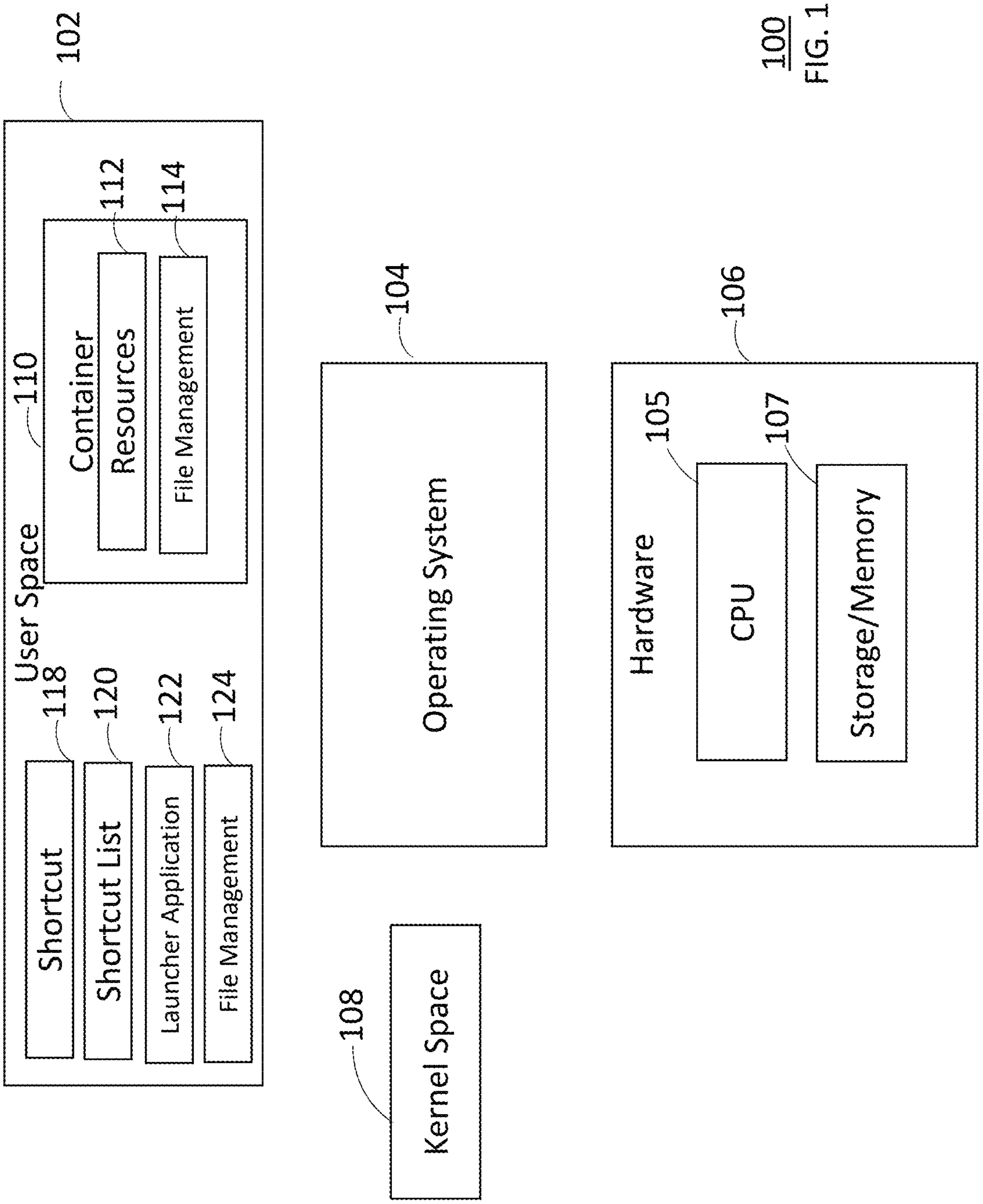
FIG. 1 is a block diagram of a device including at least one container that virtualizes at least one resource in a user space.

A security model refers to a particular approach to the strategy, design and implementation of computer systems and networks. Users and devices belonging to an organization can operate according to one or more security models. An organization implements and maintain computer systems and networks associated with varying security models. In some embodiments, a security model is a zero-trust security model that operates under a never trust, always verify policy. Under a never trust, always verify policy, users and devices are not trusted by default, even if connected to a permissioned network (e.g., such as a corporate LAN) and even if previously verified.

In some embodiments, a zero-trust security model is applied to containers operable via network devices. For example, a zero-trust security architecture applies to containers located on user devices. A container is an isolated environment where applications execute without exposing data to other applications executing outside the container. In order to isolate and protect files created by or associated with contained applications, file virtualization (e.g., containers) are implemented to redirect file system changes to an isolated area (e.g., container) that is invisible to outside applications. While file virtualization secures files in container, locating the files within a container is traditionally associated with navigating to multiple subfolders of a file system. Finding and opening isolated, contained files located deep in a chain of subfolders is challenging for end users. Because the virtualized files are stored in a separate file system i.e., the file system of the virtual environment, they are invisible to the file system of the host operating system. This limitation inhibits the productivity of the users and consumes organizational resources. For example, employee work hours are consumed when users access containerized files by navigating through multiple subfolders.

The present techniques enable virtualization and encryption of files for seamless access. In examples, the present techniques enable a seamless way to access isolated files with shadow shortcuts from a file manager that executes from a container. In examples, the container is secured using a zero-trust security model that enables secure, remote access to an organization's applications, data, and services based on predefined access control policies. File virtualization is used to redirect file system changes to an isolated area that is invisible to outside applications. In some embodiments, when file creation is observed within a container that satisfies at least one predefined rule, a shortcut pointing to a launcher application is created in an external file system. An identifier associated with the shortcut is added to a shadow shortcut list. Execution of the shortcut by the external file system causes execution of the corresponding file within the container.

Some of the advantages of these techniques include seamless access to files that execute from containers. Users are able to access containerized files from the external file system without navigating to the isolated container file location. In this manner, the user avoids navigating through multiple subfolders to access contained files. Ultimately, productivity increases as users can quickly access contained files, and employee work hours are redirected to productive activities (e.g., not consumed be searching or navigating to resources). Moreover, container-based virtualization is more lightweight when compared to hardware virtualization. Containers enable a secure execution environment where zero-trust policies are implemented.

FIG. 1 is a block diagram of a device 100 including at least one container 110 that virtualizes at least one resource in a user space 102. The device 100 may be operable according to the process 200 of FIG. 2, the workflows 300 of FIG. 3, or the process 400 of FIG. 4. In some embodiments, the device 100 is an implementation of the system 500 of FIG. 5. For ease of description, the terms intercepting, virtualizing, or containing are used to describe the isolation of resources. Additionally, containerization can be implemented using different techniques such as user space API instrumentation or user-space binary translation and emulation. In examples, a device 100 is a host system (e.g., networked computer that provides services to other systems or users).

In the example of FIG. 1, a user space 102 is illustrated. In examples, the user space 102 is defined by an operating system 104. The operating system 104 partitions the hardware 106, including a storage/memory 107, into a user space 102 and a kernel space 108. This division into serves to provide memory protection and hardware protection from malicious or errant software behaviors. Generally, the kernel space 108 executes a privileged operating system kernel, kernel extensions, and device drivers. An operating system kernel executes from a protected area of memory. The protected area of memory is an area of memory with privileged writes, which prevents the kernel from being overwritten, such as by a malicious process. In some embodiments, the kernel 112 enables communication with the hardware 106. The kernel can schedule process execution via the hardware 106 including the CPU 105. The kernel also manages read and write access to storage/memory 107, including address space provided on in storage and in memory.

Application software and some device drivers execute from the user space 102. In some embodiments, the user space 102 includes processes that execute outside of the operating system kernel space 108. The operating system 104 manages the user space 102, where user processes are run, and will constantly interact with the kernel space 108. The present techniques enable virtualization and encryption of files for seamless access. In some embodiments, at least one container 110 is instantiated within the user space 102. If no container is instantiated, execution of the launcher application 122 creates a container for execution of resources 112. In some embodiments, containers are instantiated using user-space unprivileged virtualization to access at least one resource 112. In examples, resources 110 include, but are not limited to, files such as, text, data, audio, video, image, executable, web, settings, system, compressed, backup, disk image, encoded and miscellaneous files. Additionally, in examples, resources include environment variables, dependencies, and libraries. For ease of description, the present techniques are described using an application as a resource 112 that executes within a container. However, the resources 112 can be any resources accessed via a container secured, at least in part, according to a zero-trust security architecture. In examples, the resources 112 are stored locally on an endpoint device or remotely, such as in the cloud or on a remote server.

In examples, the device 100 operates within a zero-trust security model. The zero-trust model is a risk-driven and context-aware security framework. In a zero-trust security model, access to resources is evaluated under one or more never trust, always verify policies. In examples, the device 100 is a device 216 of the zero-trust functional architecture 200 described with respect to FIG. 2. In some embodiments, the containers 110 are supported by virtualizing hardware and kernel access using the operating system. The virtualized hardware may include a virtual memory, virtual network interface, a virtual CPU, and the like.

As shown in the example of FIG. 1, the container 110 includes a file management system 114. Generally, the container 110 encapsulates components used to access or execute resources 112. The operating system 104 constrains the container's 110 access to physical resources, such as the central processing unit (CPU) 105 or storage/memory 107, so a single container cannot consume more than a fair share of a device's 100 physical resources. In some embodiments, the container includes less components when compared to a virtual machine. A container eliminates the need to launch a complete virtual machine for every application, and instead executes via an isolated system, single control host, and accesses a single kernel. Traditional virtual machines operate using a full copy of the operating system as well as a virtual copy of every hardware component running the OS. This consumes a large portion of compute resources, such as storage, memory, and processing resources. In examples, a container 110 is operable using less than a full virtualized operating system. In particular, a container is executable using portions of an operating system (e.g., operating system 104), such as the libraries and other system resources necessary to run a specific application/file (e.g., resource 110). In some embodiments, each container is customized based on requirements of corresponding resources to be containerized. In examples, the customized containers include packages, libraries, and APIs called by the resources. Thus, the container is customized by analyzing resources to be accessed and instantiating a container that includes virtualized operating system components for use by the resources. In this manner, containers can support a larger number of applications and other resources when compared to a virtual machine due to lower compute resource requirements. In some embodiments, containers are executed using cloud-based resources.

The container 110 isolates and packages an application (e.g., resources 112) for execution. The container is customized to provide virtualized resources such as packages, libraries, and APIs corresponding to the application. Additionally, the container is generated dynamically, and on-demand, as needed for execution of a corresponding application. In some embodiments, containers consume considerably less hardware resources when compared to virtualization via a full virtual machine, making containers ideal for running multiple instances of a single application, service, or web server. In some embodiments, containers function similar to virtual machines but without a hypervisor, resulting in faster resource provisioning and speedier availability of applications. containers can share access to an operating system kernel without the instantiation of a virtual machine. Generally, containerization is implemented using user space API instrumentation or user-space binary translation and emulation. For example, in a Windows operating system, applications call NtCreateFile(filepath, . . . ) API to open a file. The call is intercepted for contained applications, and the filepath is modified to redirect the call to an isolated area. For network access, a socket API such as connect( ) is intercepted and network traffic is redirected to a predetermined, contained virtual network. For memory protection, a memory allocation API, such as NtAllocateVirtualMemory, NtFreeVirtualMemory, etc. is intercepted and redirected.

In a zero-trust security model, resources 112 are secure and execute using virtualized systems and devices as provided by the container 110. A file management system 114 of the container 110 manages resources that are executed or accessed from the container 110. The file management system 114 is separate from the file management system 124 of the user space 102. In examples, because the container resources 112 are stored in a separate file system i.e., the file management system 114, the container resources 112 are invisible to the file management system 124. This limitation inhibits the productivity of the users and require organizations to provide user trainings and other information describing manual steps to access the container resources 112.

In the example of FIG. 1, the container 110 is secured using a zero-trust security model that enables secure remote access to resources 112 based on predefined access control policies. File virtualization is used to redirect file system changes to an isolated area (e.g., the container 110) that is invisible to outside applications. In some embodiments, when a new resource is created or accessed (e.g., file creation is observed) within a container that satisfies at least one predefined rule, a shortcut 118 pointing to a launcher application 122 is created in an external file system, such as the file management system 124 of FIG. 1. In examples, the shortcut is a link pointing to a launcher application 122. In examples, the shortcut is an icon displayed at a predetermined location of the device 100, such as a desktop or other file location. An identifier (e.g., Uniform Resource Identifier) associated with the shortcut is added to a shadow shortcut list 120. Execution or selection of the shortcut 118 causes execution of the corresponding resource 112 within the container 110.

The block diagram of FIG. 1 is not intended to indicate that the device 100 is to include all of the components shown in FIG. 1. Rather, the device 100 can include fewer or additional components not illustrated in FIG. 1 (e.g., additional containers, resources, shadow shortcut lists, etc.). The device 100 may include any number of additional components not shown, depending on the details of the specific implementation. Furthermore, any of the functionalities may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
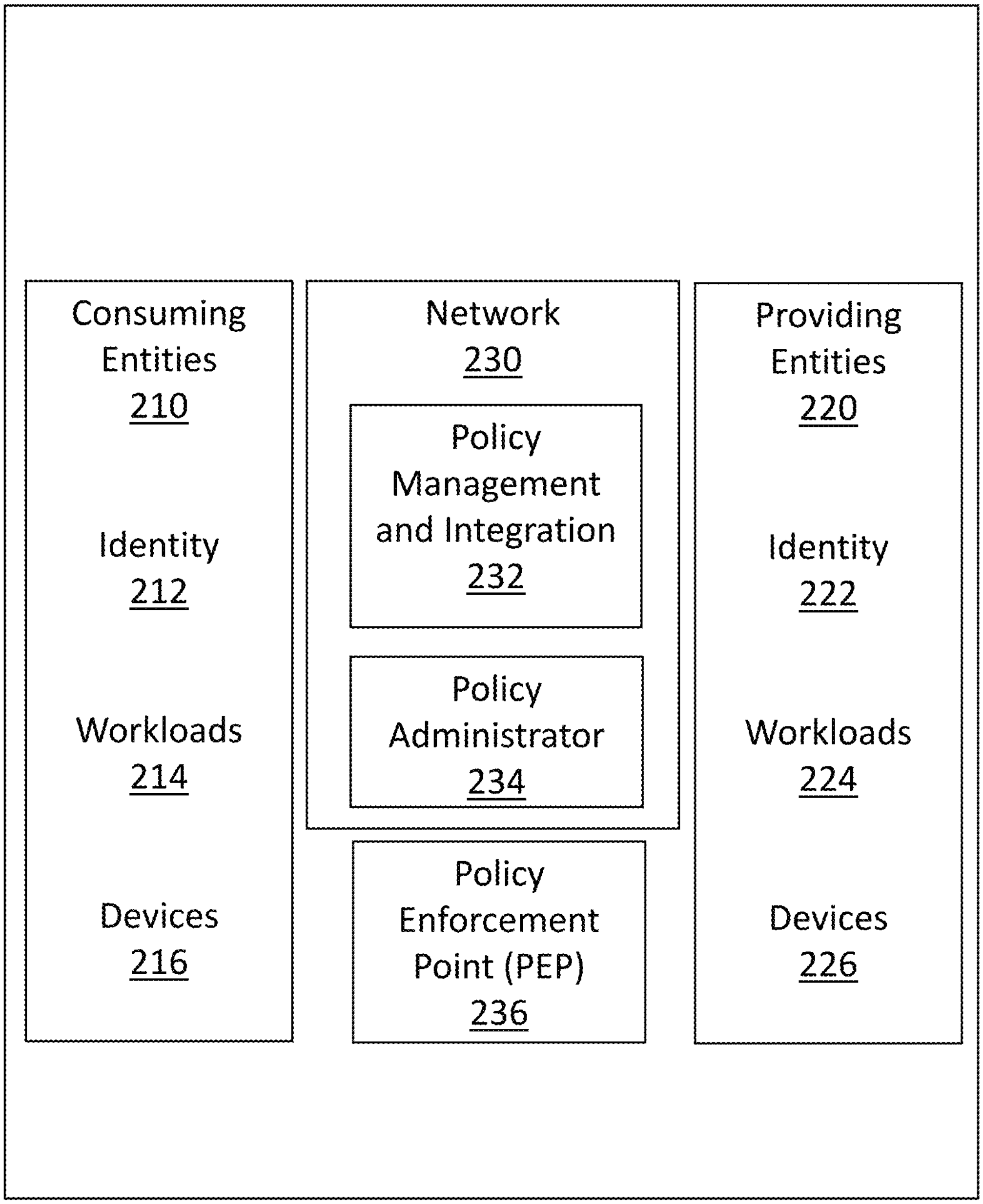
FIG. 2 is a block diagram of a zero-trust functional architecture.

FIG. 2 is a block diagram of a zero-trust functional architecture 200. In examples, the device 100 of FIG. 1 is the same as, or substantially similar to, a device 216 of the zero-trust functional architecture 200. In examples, a zero-trust security model is based on the zero-trust functional architecture 200 by establishing strong identity verification, validating device compliance prior to granting access, and ensuring least privilege access to only explicitly authorized resources.

In the example of FIG. 2, consuming entities 210 are communicatively coupled with providing entities 220 using a network 230. The network 230 implements policy management and integration 232 in support of zero-trust functionality. In examples, the network 230 may be a public network, a private network, or any combinations thereof. In examples, the network 230 is a public network with a resource/services perimeter. As shown in FIG. 2, the consuming entities are associated with an identity 212, workloads 214, and devices 216. Similarly, the providing entities are associated with an identity 222, workloads 224, and devices 226. In examples, identity is determined using consolidated identity stores (e.g., identity providers and trust-based access). In examples, the workloads are enabled access to resources using dynamic access based on health and other criteria. In examples, the devices 216 are dynamically assessed devices where trust is based on multiple criteria.

Policy management and integration 232 on the network 230 enables centralized security policy management and dynamic policy enforcement for resources. In examples, a policy administrator 234 of the policy management and integration 232 implements identify-based policies, resource-based policies, and session policies to enable the flow of information (e.g., transmitting and receiving) between the consuming entities 210 and providing entities 220. In examples, the policy administrator 234 accesses contextual data such as historic information, threat intelligence and security logs, and continuous monitoring to enforce policies that govern the flow of information between the consuming entities 210 and providing entities 220.

Accordingly, in the zero-trust functional architecture 200, a policy enforcement point 236 is communicatively coupled with the policy administrator 234. The policy enforcement point 236 enforces policies evaluated by the policy administrator 234 of the policy management and integration 232. In examples, policy enforcement point 236 enforces policies applied to containers of the devices 216 and 226.

For example, a user can request resources using a device 216, and the resources are obtained from providing entities 220 across the network 230 according to zero-trust security policies. Once the resource is created (e.g., stored or instantiated) within a container of the device, a shortcut pointing to a launcher application is created in an external file system. In examples, an identifier associated with the shortcut is added to a shadow shortcut list. Additionally, the shortcut is created in the external file system. In examples, the shortcut is a link or icon pointing to a launcher application, and the link or icon is displayed at a predetermined location of the device 216, such as a desktop or other file location. Execution or selection of the shortcut causes execution of the corresponding resource from the container.

The block diagram of FIG. 2 is not intended to indicate that the device 200 is to include all of the components shown in FIG. 2. Rather, the architecture 200 can include fewer or additional components not illustrated in FIG. 2 (e.g., additional entities, networks, policies, etc.). The architecture 200 may include any number of additional components not shown, depending on the details of the specific implementation. Furthermore, any of the functionalities may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 3:
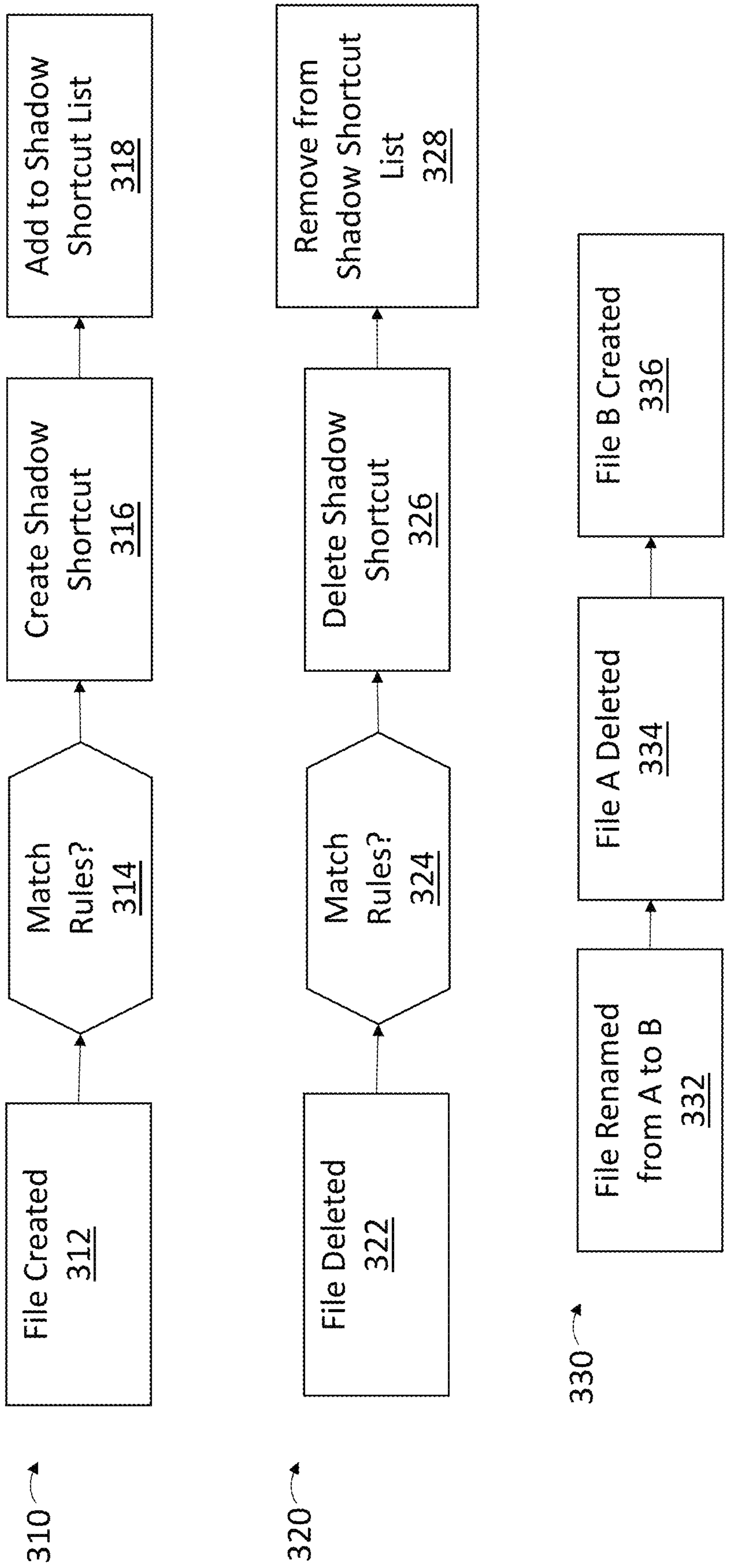
FIG. 3 is a block diagram of workflows that enables a system for virtualizing and encrypting files for seamless user access.

FIG. 3 is a block diagram of workflows 300 that enables a system for virtualizing and encrypting files for seamless user access. In examples, the workflows 300 describe shadow shortcut creation and shadow shortcut list handling based on events associated with container resources (e.g., file creation, deletion, renaming, etc.) For ease of description, the workflows 300 are described using a file as a resource that executes within a container. However, the file can be any resources accessed via a container secured, at least in part, according to a zero-trust security architecture.

In the example of FIG. 3, a workflow 310 enables shortcut creation upon creation of a containerized file. At block 312, a file is created. At block 314, it is determined if a rule is satisfied. In examples, a rule is satisfied when an event associated with file creation matches a predetermined rule. For example, rules are defined for contained files that can be accessed from file manager. The rules can, for example, be based on file characteristics such as a file name, file path, file type, file size, file attribute, author, file digital signature, vendor name, etc. In some embodiments, a file virtualization engine of the container (e.g., container 110) monitors for file creation, renaming, or deletion which matches a predefined rule. File creation can be monitored by intercepting file system calls associated with file creation and deletion. For example, codes is injected to target applications in order to intercept file system calls such as CreateFile and DeleteFile. In examples, a file virtualization engine manages and enables access to resources of a network. The file virtualization engine enables user access to files and folders that are located on multiple servers at multiple locations as though they were all in the same place.

At block 316, a shadow shortcut is created corresponding to the created file. In examples, the shadow shortcut is a handle or record that enables a user to find a file, website, or other resource located in a different directory or folder from the place where the shortcut is located. In examples, the shortcut is located on a user desktop, home screen, or other top level file location accessible by a user.

At block 318, a corresponding entry associated with the created file and shadow shortcut is added to a shadow shortcut list. In examples, a list of shadow shortcuts is maintained for each user, for each session, or for some other predetermined period of authentication. The shadow shortcut list is initialized as empty. In examples, when a file creation is observed, a shortcut/link file with same name is created in a file system external to the container. The shortcut link/file points to a launcher application, icon of the shortcut is same as the created file, path of the created file is also passed to shortcut/link as parameter. Created shortcut is then added to shadow shortcut list. For example, in a Windows-type operating system, when D:\sales.docx is created in container, a D:\sales.docx.lnk shortcut file is created, it points to "C:\container\launcher.exe D:\sales.docx" where launcher.exe is a launcher application to run application and file in container.

Workflow 320 enables shortcut handling upon deletion of a containerized file. At block 322, a file deletion is confirmed. At block 324, it is determined if a rule is satisfied. If a rule is satisfied, the shadow shortcut is deleted. A rule may be, for example, when a resource in container is deleted, the shadow shortcut pointing to it is deleted. Additionally, a rule may be that when container is cleaned, all resources in it are removed, thus all shadow shortcuts referring to the container are deleted. At block 326, a shadow shortcut is deleted corresponding to the deleted file. In examples, an icon representing the shortcut associated with the deleted file is deleted. At block 328, the corresponding entry on the shadow shortcut list is removed. Accordingly, when a deletion is observed, the corresponding shortcut/link file is removed, and the shortcut/link file is also removed from shadow shortcut list. For example, in Windows system, when D:\sales.docx is removed, D:\sales.docx.lnk is also removed.

Workflow 330 enables shortcut renaming upon renaming of a containerized file. At block 332, a file rename is confirmed from a first file name to a second file name. At block 334, a shortcut associated with the first file name is deleted, and the corresponding entry is deleted from the shadow shortcut list. At block 336, the shortcut associated with the second file name is created, and a corresponding entry is added to the shadow shortcut list. In some embodiments, renaming a containerized file is handled in the same way as deleting old file and creating new file. When a container is cleaned or removed, all shadow shortcuts associated with an entry in the shadow shortcut list for the container are deleted. In examples, cleaning a container removes files created/modified in the container. A cleaned container has the same status as a newly created container.

Figure 4:
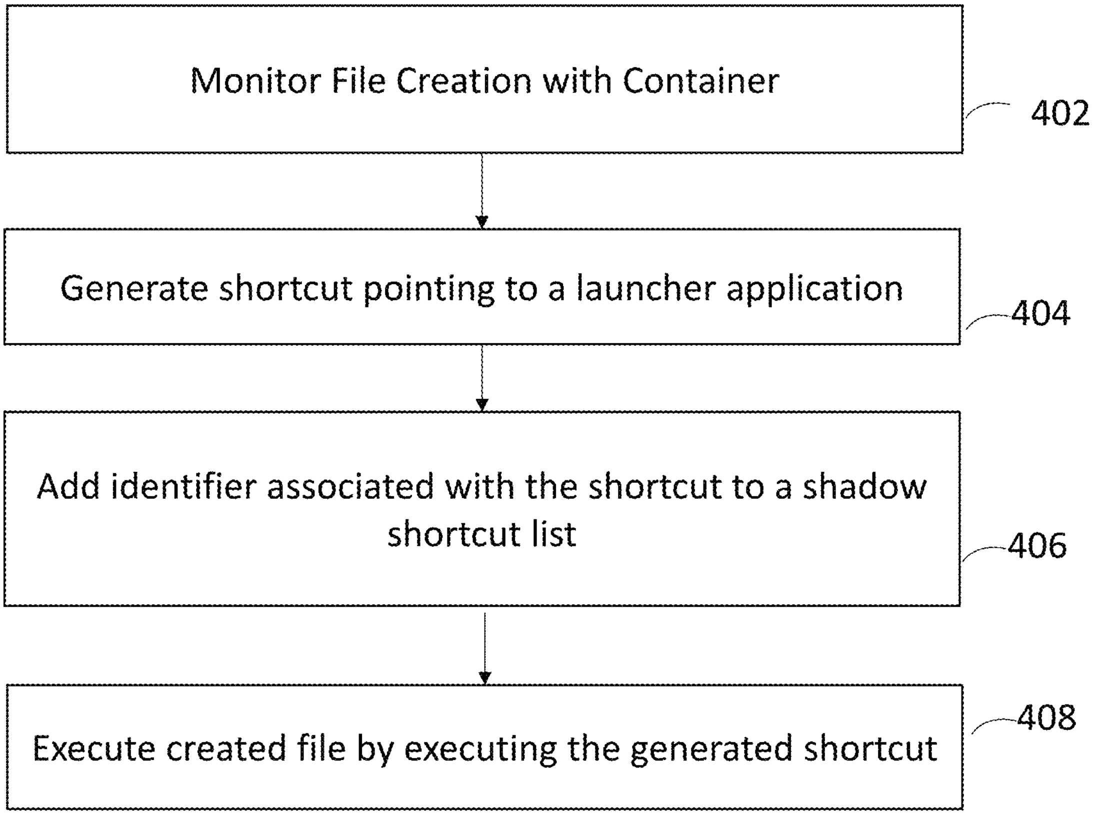
FIG. 4 is a block diagram of a process that enables a system for virtualizing and encrypting files for seamless user access.

FIG. 4 is a block diagram of a process 400 that enables a system for virtualizing and encrypting files for seamless user access. In examples, the block diagram executes using a device that is the same as or substantially similar to the device 100 of FIG. 1, the devices 216 or 226 if FIG. 2, or the system 500 of FIG. 5. In examples, the process 400 of FIG. 4 includes the workflows 300 of FIG. 3.

At block 402, file creation within a container executing using a host system is monitored for file creation that satisfies at least one predefined rule. The container is, for example, the container 110 of FIG. 1. In examples, the container is an isolated, secure area that enables virtualization within a zero-trust security model. In some embodiments, virtualization is done in a user space without requiring any kernel level component such as a file system driver. When applications in container writes to a file, the content is encrypted before being written to disk.

At block 404, a shortcut is generated pointing to a launcher application on an external file system of the device when a file is created. In examples, the shortcut is a link, file, or executable. In examples, the external file system is a file system not associated with the file system of the container. In some embodiments, the shortcut is named according to an original file name of the created file, but the target of the shortcut is an executable image so that command line parameters passed to this executable contain information about the original and redirected file location. In examples, the container includes other files not included in the shadow file list, that are still redirected. During operation/execution of files in the container, file system access for files and other resources of the container (and not necessarily limited to the shadow shortcut operations) are redirected, and the redirected files are encrypted at the file level. In some embodiments, the redirected files are stored on a separate virtual disk and optionally the disk is encrypted at disk level.

At block 406, an identifier associated with the shortcut is added to a shadow shortcut list. In examples, the identifier is a Uniform resource identifier (URL). In examples, the identifier is a file identification that is a unique identifier assigned to each file by the file system.

At block 408, the shortcut is executed from external file system, wherein access or execution of the shortcut causes execution of the created file within the security container. For example, double clicking an icon (e.g., shortcut) on a desktop causes execution of the corresponding contained file.

In some embodiments, shadow shortcuts are deleted in response to the deletion of the corresponding resource from a container as described with respect to the workflow 320 of FIG. 3. In examples, an icon representing the shortcut associated with the deleted file is deleted. Shadow shortcuts are renamed as described with respect to the workflow 330 of FIG. 3. Accordingly, the present techniques enable a system which provides application virtualization such that the virtualization does not use hardware virtualization. The present techniques intercept file system operations of the operating system for a container, such as an application. In some embodiments, the container applications on disk image is not modified i.e., it is an unmodified application. The intercepted file system operations (e.g., the virtual file system), include create, move, delete, and rename operations and the system redirects them by modifying the original requests to a virtual location. The system then creates a shortcut file for the virtualized file in the original location so that a "shadow" shortcut for every file is created for easy access.

Figure 5:
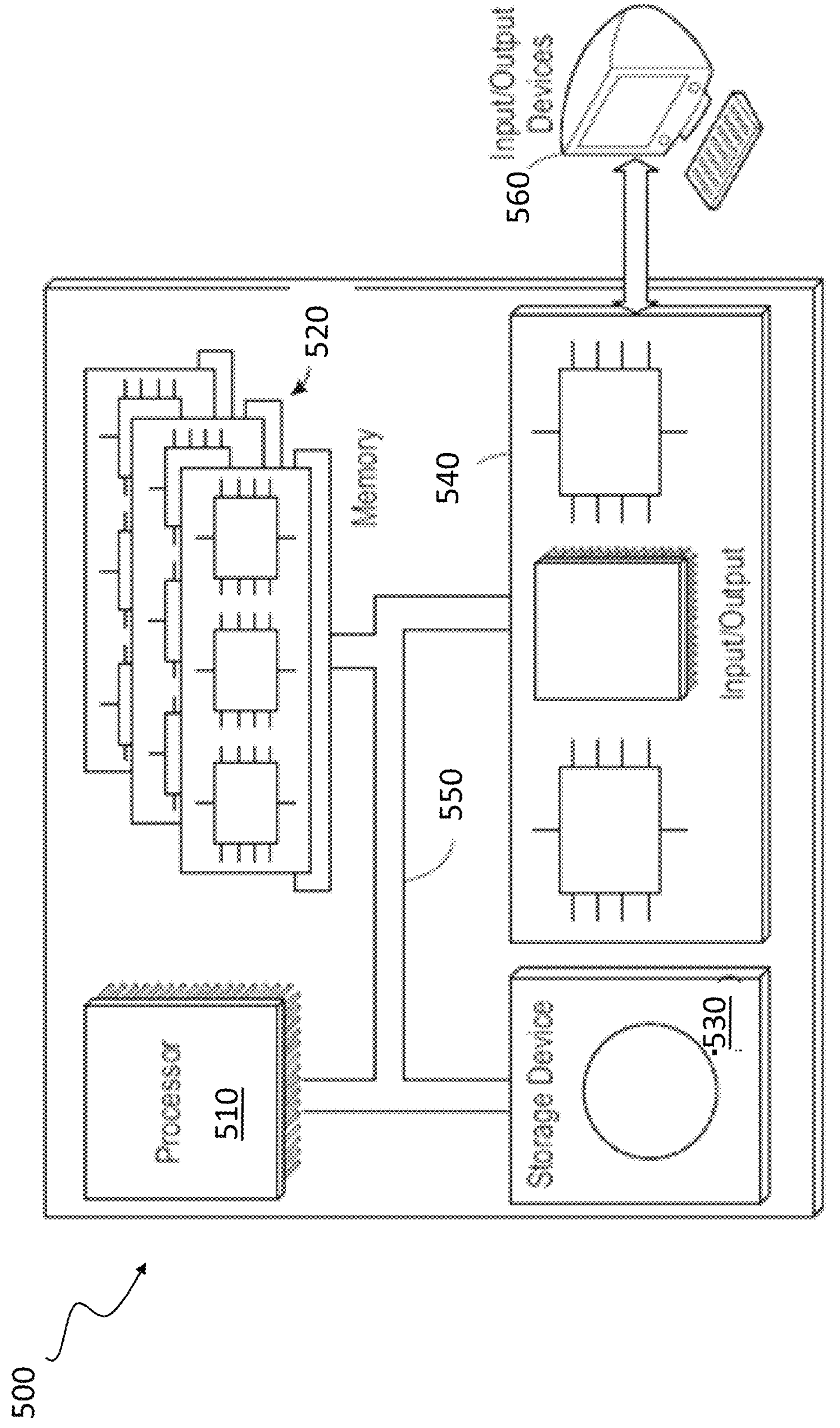
FIG. 5 is a block diagram of an example computer system that enables a virtualizing and encrypting files for seamless user access.

FIG. 5 is a block diagram of an example computer system that enables a virtualizing and encrypting files for seamless user access. For example, referring to FIG. 1, user space 102, operating system 104, hardware 106, and kernel space 108 could be a part of an example of the system 500 described here. The system 500 includes a processor 510, a memory 520, a storage device 530, and one or more input/output interface devices 540. Each of the components 510, 520, 530, and 540 can be interconnected, for example, using a system bus 550.

The processor 510 is capable of processing instructions for execution within the system 500. The term "execution" as used here refers to a technique in which program code causes a processor to carry out one or more processor instructions. The processor 510 is capable of processing instructions stored in the memory 520 or on the storage device 530. The processor 510 may execute operations such as process memory protection against foreign code injection.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a non-transitory computer-readable medium. In various different implementations, the storage device 530 can include, for example, a hard disk device, an optical disk device, a solid-state drive, a flash drive, magnetic tape, or some other large capacity storage device. In some implementations, the storage device 530 may be a cloud storage device, e.g., a logical storage device including one or more physical storage devices distributed on a network and accessed using a network. The input/output interface devices 540 provide input/output operations for the system 500. In some implementations, the input/output interface devices 540 can include one or more of a network interface devices, e.g., an Ethernet interface, a serial communication device, e.g., an RS-232 interface, and/or a wireless interface device, e.g., an 802.11 interface, a 3G wireless modem, a 5G wireless modem, a 7G wireless modem, etc. A network interface device allows the system 500 to communicate, for example, transmit and receive such data. In some implementations, the input/output device can include driver devices configured to receive input data and send output data to other input/output devices, e.g., keyboard, printer and display devices 560. In some implementations, mobile computing devices, mobile communication devices, and other devices can be used.

A server or database system can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 500 is contained within a single integrated circuit package. A system 500 of this kind, in which both a processor 510 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 540.

Although an example processing system has been described in FIG. 5, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of nonvolatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM, DVD-ROM, and Blu-Ray disks. The processor and the memory can be supplemented by, or incorporated in, special purpose logic circuitry. Sometimes a server is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. For example, the functionality described herein may be realized through an application or "app." The app may be located on the device as described herein. The app may also be located on a second device communicatively coupled with a device as described herein. The components of the system can be interconnected by any form or medium of digital data communication, e.g., a communication network. Examples of communication networks include a local area network ("LAN") and a wide area network ("WAN"), e.g., the Internet. The components of the system may also communicate via short range wireless communication standard, such as Bluetooth.

A number of embodiments of the invention have been described. Nevertheless, it will be understood that various modifications may be made without departing from the spirit and scope of the invention.

What is claimed is:

1. A method comprising:

monitoring, using at least one hardware processor, file creation within a container located on a host system for creation that satisfies at least one predefined rule;

generating, using the at least one hardware processor, a shortcut pointing to a launcher application on an external file system of the host system when a file is created, wherein a target of the shortcut is an executable image;

adding, using the at least one hardware processor, an identifier associated with the shortcut to a shadow shortcut list; and executing, using the at least one hardware processor, the shortcut from the external file system, wherein executing the shortcut causes execution of the created file within the container and wherein command line parameters passed by the executable image contain information about an original file location and a redirected file location.

2. The method of claim 1, wherein the at least one predefined rule is one of a predetermined file name, file path, file type, file size, file attribute, or author.

3. The method of claim 1, comprising removing the shortcut from the external file system and removing the identifier associated with the shortcut from the shadow shortcut list responsive to the file being deleted from the container.

4. The method of claim 1, comprising renaming the shortcut from the external file system and renaming the identifier associated with the shortcut from the shadow shortcut list responsive to the file being deleted from the container.

5. The method of claim 1, comprising intercepting file system requests directed to the containerized file to the shortcut using the shadow shortcut list.

6. The method of claim 1, comprising executing the shortcut from the external file system without kernel level components.

7. The method of claim 1, wherein redirected files associated with the container are encrypted at a file level.

8. The method of claim 1, wherein redirected files are stored on a separate virtual disk and optionally the disk is encrypted at disk level.

9. A system, comprising:

at least one processor, and at least one non-transitory storage media storing instructions that, when executed by the at least one processor, cause the at least one processor to:

monitor file creation within a container located on a host system for creation that satisfies at least one predefined rule;

generate a shortcut pointing to a launcher application on an external file system of the host system when a file is created, wherein a target of the shortcut is an executable image;

add an identifier associated with the shortcut to a shadow shortcut list; and execute the shortcut from the external file system, wherein executing the shortcut causes execution of the created file within the container and wherein command line parameters passed by the executable image contain information about an original file location and a redirected file location.

10. The system of claim 9, wherein the at least one predefined rule is one of a predetermined file name, file path, file type, file size, file attribute, or author.

11. The system of claim 9, comprising removing the shortcut from the external file system and removing the identifier associated with the shortcut from the shadow shortcut list responsive to the file being deleted from the container.

12. The system of claim 9, comprising renaming the shortcut from the external file system and renaming the identifier associated with the shortcut from the shadow shortcut list responsive to the file being deleted from the container.

13. The system of claim 9, comprising intercepting file system requests directed to the containerized file to the shortcut using the shadow shortcut list.

14. The system of claim 9, comprising executing the shortcut from the external file system without kernel level components.

15. At least one non-transitory storage media storing instructions that, when executed by at least one processor, cause the at least one processor to:

monitor file creation within a container located on a host system for creation that satisfies at least one predefined rule;

generate a shortcut pointing to a launcher application on an external file system of the host system when a file is created, wherein a target of the shortcut is an executable image;

add an identifier associated with the shortcut to a shadow shortcut list; and execute the shortcut from the external file system, wherein executing the shortcut causes execution of the created file within the container and wherein command line parameters passed by the executable image contain information about an original file location and a redirected file location.

16. The at least one non-transitory storage media of claim 15, wherein the at least one predefined rule is one of a file name, file path, file type, file size, file attribute, or author.

17. The at least one non-transitory storage media of claim 15, comprising removing the shortcut from the external file system and removing the identifier associated with the shortcut from the shadow shortcut list responsive to the file being deleted from the container.

18. The at least one non-transitory storage media of claim 15, comprising renaming the shortcut from the external file system and renaming the identifier associated with the shortcut from the shadow shortcut list responsive to the file being deleted from the container.

* * * * *